United States Patent
Kimura et al.

[11] 3,746,532
[45] July 17, 1973

[54] HERBICIDAL COMPOSITION OF THIOCARBAMATE AND 3(3,4-DICHLOROPHENYL)-1-METHOXY-1-METHYLUREA

[75] Inventors: Ichiro Kimura; Yoshiro Takahashi, both of Shizuoka; Hideo Ito, Shimizu, all of Japan

[73] Assignee: Kumiai Chemical Industry Co., Ltd., Tokyo, Japan

[22] Filed: July 13, 1971

[21] Appl. No.: 162,259

[30] Foreign Application Priority Data
July 16, 1970 Japan.................... 45/61739

[52] U.S. Cl. .................... 71/100, 71/120
[51] Int. Cl. .................... A01n 9/02
[58] Field of Search .............. 71/100, 120

[56] References Cited
UNITED STATES PATENTS
3,037,853  6/1962  Luckenbaugh .......... 71/93
3,112,342  11/1963  Luckenbaugh .......... 71/100
3,385,690  5/1968  Luckenbaugh .......... 71/93
3,671,216  6/1972  Kado et al. .......... 71/100

FOREIGN PATENTS OR APPLICATIONS
634,786  1/1962  Canada .................. 71/100

OTHER PUBLICATIONS
Kimura et al., "Herbicidal Cymetrin etc.," (1970), CA72, no. 120341v. (1970).

*Primary Examiner*—Elbert L. Roberts
*Assistant Examiner*—G. Hollrah
*Attorney*—Norman F. Oblon et al.

[57] ABSTRACT

A herbicidal composition having synergistic properties is prepared by combining a thiocarbamate having the general formula:

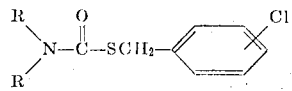

wherein R is a lower alkyl group, and 3(3,4-dichlorophenyl)-1-methoxy-1-methylurea, having the formula:

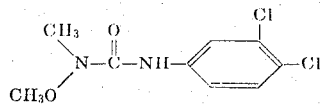

10 Claims, No Drawings

HERBICIDAL COMPOSITION OF THIOCARBAMATE AND 3(3,4-DICHLOROPHENYL)-1-METHOXY-1-METHYLUREA

BACKGROUND OF THE INVENTION

1. Field Of The Invention:

This invention relates to a herbicidal composition comprising a synergistic combination of two types of active ingredients.

2. Description Of Prior Art:

It is known that S-(chlorobenzyl)-N,N-dialkylthiocarbamate, a non-hormone type herbicide, is useful for inhibiting barnyard grass and slender spikerush during initial growth periods. It is also known that this material can be used instead of PCP (sodium pentachlorophenoxide) which has heretofore been widely recognized for this purpose. However, this compound has the disadvantage that sufficient herbicidal effects against broad-leaved weeds in up-land fields cannot be obtained using an economically feasible quantity of the compound.

It is also known that 3-(3,4-dichlorophenyl)-1-methoxy-1-methylurea, a non-hormone type urea derivative herbicide, demonstrates good herbicidal effects, when applied in amounts of 100 to 200 g. per 10 Ares, and is particularly effective toward broad-leaved weeds. However, this urea derivative is very slow acting and can cause chemical injury to the desired plants, especially in paddy fields having a high moisture content.

A wide variety of other carbamate type herbicides have also been used especially for up-land field applications. For example, typical carbamates include Cl-IPC (isopropyl-N-3-chlorophenyl carbamate), IPC (isopropyl N-phenylcarbamate), CBN (4-chloro-2-butynyl N-(3-chlorophenyl) carbamate, etc. Although these herbicides are effective at relatively low temperatures, they have a disadvantageously short effective life, especially at higher summer temperatures, and they tend to lose their activity within 4 to 5 days.

S-(chlorobenzyl)-N,N-dialkylthiocarbumate differs from these other carbamates in that it is characterized by a relatively longer life without being affected by temperature, and its effective life is from thirty to forty days, even during the summer months. The toxicity of this compound toward such useful plants as soybean, dry land rice, cotton, corn, wheat and barley is quite low, so it can be used safely even when applied in amounts of eight to ten times the quantity normally required for effective inhibition of gramineous weeds, such as barnyard grass, large crabgrass and water foxtail. However, in order to completely inhibit broad-leaved weeds, eight to ten times the quantity needed for gramineous weeds, is required.

SUMMARY OF THE INVENTION

Accordingly, it is one object of this invention to provide a herbicidal composition comprising a synergistic combination of two types of active ingredients, whereby the herbicidal effects of both ingredients can be increased in order that the scope of possible application as a herbicide can be enlarged, and the quantity of ingredients required can be decreased for more economical application.

This and other objects can be attained by providing a herbicidal composition having synergistic effects, which comprises the combination of S-(chlorobenzyl)-N,N-dialkythicarbamate, having the general formula:

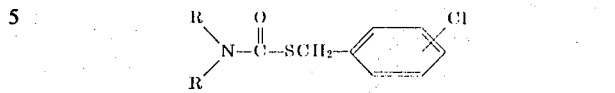

wherein R represents a lower alkyl group, and 3(3,4-dichlorophenyl)-1-methoxy-1-methylurea, having the formula:

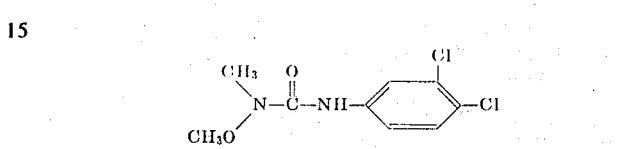

DETAILED DESCRIPTION OF THE EMBODIMENTS

It has now been found that a large variety of weeds, including paddy weeds, can be completely inhibited, without causing chemical injury to the useful plants, by applying the combination of S-(chlorobenzyl)-N,N-dialkylthiocarbamate and 3-(3,4-dichlorophenyl)-1-methoxy-1-methylurea.

Suitable S-(chlorobenzyl)-N,N-dialkylthiocarbamates include: S-(4-chlorobenzyl)-N,N-diethylthiocarbamate, S-(4-chlorobenzyl)-N,N-dimethylthiocarbamate, S-(2-chlorobenzyl)-N,N-diisopropylthiocarbamate, S-(2-chlorobenzyl)-N,N-diethylthiocarbamate and S-(4-chlorobenzyl)-N,N-diisopropylthiocarbamate.

These compounds can be prepared by reacting the corresponding dialkylamine with carbonyl sulfide (COS) and chlorobenzyl halides in the presence of a base. 3-(3,4-dichlorophenyl)-1-methoxy-1-methylurea has a melting point of 93°–94°C. and can be prepared as follows:

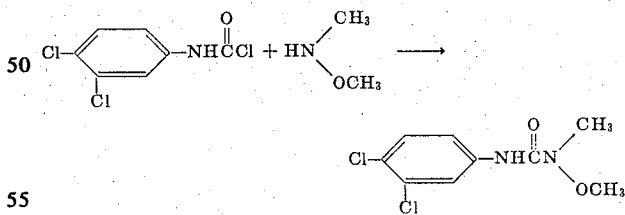

The mixing ratio of S-(chloro-benzyl)-N,N-dialkylthiocarbamate to 3-(3,4-dichlorophenyl)-1-methoxy-1-methylurea is preferably 25:1 – 5:1, and especially about 10:1 by weight. It is preferable to use 200–500 g of S-(chlorobenzyl)-N,N-dialkylthiocarbamate and 20 -40 g of 3-(3,4-dichlorophenyl)-1-methoxy-1-methylurea per 10 Ares of up-land field, and when applied in these amounts, a large variety of weeds, including large crabgrass, barnyard grass, lady's thumb, goosefoot, horsetail, Asiatic dayflower, etc. ,can be completely inhibited without causing chemical injury to such useful plants a paddy rice, dry-land rice, soybean, cotton, wheat, corn or barley. In particular, it is quite unexpected that the composition of the present invention is effective against Asiatic dayflower, since this weed is not inhibited by either of two ingredients when used individually. Moreover, it has surprisingly been found that if 200 – 500 g of S-(chlorobenzyl)-N,N-dialkylthiocarbamate or 20 – 40 g of 3-(3,4-dichlorophenyl)-1-methoxy-1-methylurea per 10 Ares are used individually, they are ineffective toward broad-leaved weeds or gramineous weeds. It is clear, therefore, that the combination of the two active ingredients provides synergistic effects.

The herbicidal composition of this invention can be effectively applied to water logged fields, such as paddy fields, with good results.

The herbicidal composition of this ivnention can be a simple mixture of the two active ingredients or a mixture of the active ingredients with conventional liquid or solid inert carriers. For instance, suitable inert carriers include water or organic solvents, such as xylene, cyclohexanone and dimethylformamide. If necessary, a surfactant can be included in the composition. Suitable solid inert carriers include bentonite, clay, talc, diatomaceous earth, and porcelain clay.

The herbicidal composition can be applied by dusting, spraying or scattering the composition, in the form of granules, powder or liquid with the inert carrier. It is preferable to apply the herbicidal composition just subsequent to sowing seeds of dry-land rice, soybeam, cotton, corn, or wheat. The herbicidal composition can be applied not only to up-land fields, but also to rice paddy fields.

Good results are attained when the ratio of said thiocarbamate to said 3-(3,4-dichlorophenyl)-1-methoxy-1-methylurea is 25:1 - 5:1 by weight.

If necessary, the active ingredients can be admixed with other conventional insecticides, fungicides or herbicides for specialty purposes.

Having generally described the invention, a further understanding can be obtained by reference to certain specific Examples which are provided herein for purpose of illustration only and are not intended to be limiting in any manner. The percentages shown in the Examples are percentages by weight.

(Example 1) Granule

Seven percent of S-(4-chlorobenzyl)-N,N-diethylthiocarbamate, 0.7 percent of 3-(3,4-dichlorophenyl)-1-methoxy-1-methylurea, 2 percent of sodium lignine sulfonate, 5 percent of white carbon (silica powder) and 85.3 percent of bentonite were crushed and admixed with a suitable amount of water, kneaded, and granulated by an extrusion granulating machine. The granules were then dried and sifted using a 14–32 mesh sieve.

(Example 2) Powder

Ten percent of S-(4-chlorobenzyl)-N,N-diethylthiocarbamate, 2 percent of 3-(3,4-Dichlorophenyl)-1methoxy-1-methylurea, 88 percent of mixture of diatomaceous earth and clay powder were crushed and mixed to yield a powder composition.

(Example 3) Wettable Powder

Twenty percent of S-(4-chlorobenzyl)-N,N-diethylthiocarbamate, 1 percent of 3-(3,4-dichlorophenyl)-1-methoxy-1-methylurea, 3 percent of sodium lauryl sulfate, 2 percent of sodium dinaphthylmethane sulfonate, twenty percent of white carbon (silica powder) and 54 percent of diatomaceous earth were mixed and crushed to yield a wettable powder.

(Example 4) Emulsion

Forty percent of S-(4-chlorobenzyl)-N,N-diethylthiocarbamate, 4 percent of 3-(3,4-dichlorophenyl)-1-methoxy-1-methylurea, 15 percent of a mixture of polyoxyethane alkylphenyl ether and calcium-alkylbenzenesulfonate and 41 percent of xylene were mixed to yield an emulsion.

(Example 5) Granules

Seven percent of S-(2-chlorobenzyl)-N,N-diethylthiocarbamate, 0.7 percent of 3-(3,4-dichlorophenyl)-1-methoxy-1-methylurea, 2 percent of sodium lignin sulfonate, 5 percent of white carbon (silica powder) and 85.3 percent of bentonite were crushed and uniformly mixed, and the granules were prepared, in accordance with the process of Example 1.

(Example 6) Emulsion

Forty percent of S-(4-chlorobenzyl)-N,N-diisopropylthiocarbamate, 4 percent of 3-(3,4-dichlorophenyl)-1-methoxy-1-methylurea, 15 percent of a mixture of polyoxyethane alkylphenyl ether and calcium alkylbenzene sulfonate, and 41 percent of xylene were mixed to dissolve them, to yield an emulsion. Certain experimental results by applying the herbicidal composition of this invention are illustrated.

(EXPERIMENT 1)

Test of herbicidal effect in field applications

After sowing seeds of soybean, cotton, corn, wheat, dry-land rice, and paddy rice on each of 1 m$^2$ of up-land field, a soil containing a specific amount of broad-leaved weed seeds of large crabgrass, barnyard grass, lady's thumb, goosefoot and gramineous weeds of large crabgrass and barnyard grass was applied to the field.

Each wettable powder containing the two active ingredients, was diluted at the rate of 200 liters of water per 10 Ares and sprayed onto the field. One month following the application, the growth of weeds and chemical injury of useful plants were, respectively, observed.

| Test period: | from July 15th to August 15th |
|---|---|
| Sunny days: | 25 days |
| Sunlight: | 167 hours |
| Rainy days: | 5 days |
| Rain fall (precipitation) | 155.6 mm. |
| Test place | Kikukawa-cho Ogasa-gun Shizuoka-ken, Japan |

The results are shown in Table 1, wherein the amount of ingredient is the weight of ingredient per 10 Ares, and the herbicidal effect is shown as the following indications:

| | |
|---|---|
| 5 | dead |
| 4 | severe inhibition |
| 3 | fair inhibition |
| 2 | moderate inhibition |
| 1 | slight inhibition |
| 0 | no effect |

TABLE 1

| Active ingredient | Amount of ingredient, g./10 ares | Herbicidal effect | | | Chemical injury | | | | | |
|---|---|---|---|---|---|---|---|---|---|---|
| | | E* | F* | G* | Soybean | Cotton | Wheat | Corn | Rice, dry | Rice paddy |
| Compound A | 50 | 0 | 0 | 0 | None | None | None | None | None | None. |
| | 100 | 1 | 1 | 0 | do | do | do | do | do | Do. |
| | 200 | 3 | 3 | 1 | do | do | do | do | do | Do. |
| Compound B | 10 | 0 | 0 | 0 | None | None | None | None | None | None. |
| | 20 | 1 | 0 | 1 | do | do | do | do | do | +. |
| | 40 | 2 | 1 | 2 | do | do | do | + | ++ | ++. |
| | 100 | 3 | 3 | 5 | ++ | do | ++ | ++ | +++ | ++++. |
| Composition of compound: A+B | A+B | | | | | | | | | |
| | 25+10 | 3 | 2 | 3 | None | None | None | None | None | None. |
| | 50+20 | 4 | 3 | 4 | do | do | do | do | do | Do. |
| | 100+40 | 5 | 4 | 5 | do | do | do | do | do | Do. |
| | 200+40 | 5 | 5 | 5 | do | do | do | do | do | Do. |
| (A–B) | 200+20 | 5 | 5 | 5 | do | do | do | do | do | Do. |
| No treatment | | 0 | 0 | 0 | None | None | None | None | None | None. |

NOTES:
+=Very slight; ++=Slight; +++=Fair; ++++=Severe.
E*=Large crabgrass; F*=Barnyard grass; G*=Broad-leaved weeds.
Compound A=S-(4-chlorobenzyl)-N,N-diethylthiocarbamate; Compound B=3-(3,4-dichlorophenyl)-1-methoxy-1-methylurea.

(Experiment 2)

Herbicidal Test

A pot of 800 cm² made of polyethylene was filled with up-land soil and further was covered to a depth of 0.5 cm. with soil containing 50 pieces of various seeds shown in Table II, each of various seeds per pot. The emulsion of herbicidal composition prepared in Example 4 was diluted with water and was applied at the rate of 12 ml. per pot.

Following the application, the pot was kept in a greenhouse at an average temperature of 25°C. 40 days after the application of the herbicides, the herbicidal effects were observed in accordance with the measurement of Experiment 1.

The results are shown in Table II.

TABLE II

| Active Ingredient | Amount of Ingredient (g/10 Ares) | Herbicidal Effect | | | | | | |
|---|---|---|---|---|---|---|---|---|
| | | F* | E* | H* | I* | J* | K* | L* |
| Compound A | 25 | 1 | 1 | 0 | 0 | 0 | 0 | 0 |
| | 50 | 2 | 2 | 0 | 0 | 0 | 0 | 0 |
| | 100 | 3 | 3 | 0 | 1 | 0 | 0 | 0 |
| (control) | 200 | 4 | 3 | 2 | 2 | 2 | 0 | 0 |
| | 400 | 5 | 4 | 3 | 4 | 4 | 1 | 2 |
| Compound B | 6.25 | 0 | 0 | 0 | 0 | 1 | 0 | 0 |
| | 12.5 | 0 | 1 | 0 | 2 | 3 | 0 | 0 |
| (control) | 25 | 0 | 3 | 1 | 4 | 4 | 0 | 0 |
| | 50 | 2 | 4 | 3 | 4–5 | 5 | 0 | 0 |
| Composition of compounds A+B | A+B | | | | | | | |
| | 45+5 | 4 | 4 | 4 | 3 | 4 | 2 | 3 |
| | 90+10 | 5 | 5 | 4–5 | 4 | 5 | 4 | 9 |
| | 180+20 | 5 | 5 | 5 | 5 | 5 | 5 | 5 |
| | 360+40 | 5 | 5 | 5 | 5 | 5 | 5 | 5 |
| No treatment | — | 0 | 0 | 0 | 0 | 0 | 0 | 0 |

*E large crabgrass
*F barnyard millet
*H goosefoot
*I barnyard grass
*J lady's-thumb
*K Asiatic dayflower
*L Anelena Keisak HASSK (EXPERIMENT 3)

Herbicidal test in dry field by sowing seeds

The field having weeds seeds of barnyard grass in paddy field, Asiatic dayflower, lady's-thumb was divided into 4m² per block (2 × 2 m.) and rice seeds, (species = Kimmaze) were sowed in three lines. Next day, the wettable powder prepared in Example 3 or control diluted with water, was sprayed at the rate of 150 liters per 10 Ares.

Rice was planted by conventional direct seed sowing method onto dry field.

Forty days after the application of the herbicides, the herbicidal effects were observed, in accordance with the measurement of Experiment 1. Then the field was filled with water to a depth of 5 cm. The results from an average of three blocks are shown in Table III. The herbicidal tests were made in each three blocks

TABLE III

| Active ingredient | Amount of ingredient (g/10 Ares) | Herbicidal Effect | | | Chemical Injury |
|---|---|---|---|---|---|
| | | M* | J* | K* | |
| Compound A | 200 | 2 | 0 | 0 | none |
| (control) | 400 | 4 | 2 | 0 | " |
| | 600 | 4–5 | 4 | 1 | " |
| Compound B | 25 | 1 | 2 | 0 | ++ |
| | 50 | 2 | 3 | 0 | +++ |
| (control) | 100 | 3–4 | 4 | 0 | ++++ |
| | 200 | 4–5 | 4–5 | 1 | ++++ |
| Composition of Compounds A+B | A+B | | | | |
| | 90+10 | 3 | 3 | 2 | none |
| | 180+20 | 4 | 4 | 3–4 | " |
| | 360+40 | 5 | 5 | 5 | 37 |
| | 720+80 | 5 | 5 | 5 | + |
| No treatment | — | 0 | 0 | 0 | none |

* M barnyard grass in paddy field
* J lady's-thumb
* K Asiatic dayflower (Experiment 4)

Herbicidal effect in soybean field

A dry field of volcanic soil having good permeability and medium water-retaining property and containing humus soil was cultivated by a tractor on May 18, and was divided into 15 m² per block and the herbicidal tests were made in each two blocks.

On May 26, soybean seeds were sowed. Each predetermined amount of herbicide was diluted with water at the rate of 100 liters per 10 Ares and was sprayed to the field by a small size sprayer two days after seeding before germination.

On July 6, after 39 days from the application of herbicide, the herbicidal effects were observed.

The results at average of two blocks are shown in Table IV.

TABLE IV

| Active ingredient | Amount, g./10 ares | Herbicidal effect=The number of growing weeds (fresh weight) | | | | | | Chemical injury |
|---|---|---|---|---|---|---|---|---|
| | | N* | H* | O* | K* | P* | Q* | |
| Compound A | 100 | 49.5<br>¹ (429.0 g.) | 71.0<br>¹ (132.0 g.) | 56.5<br>¹ (10.4 g.) | 38.0<br>¹ (182.1 g.) | 2.0<br>¹ (1.0 g.) | 17.5<br>¹ (26.0 g.) | None. |
| | 200 | 13.0<br>¹ (100.2) | 42.5<br>¹ (116.2) | 7.4<br>¹ (8.2) | 36.5<br>¹ (124.2) | 1.0<br>¹ (0.9) | 8.5<br>¹ (12.9) | Do. |
| | 400 | 10.5<br>¹ (78.2) | 12.0<br>¹ (164) | 2.0<br>¹ (0.5) | 16.5<br>¹ (52.0) | 0.0<br>¹ (0) | 3.0<br>¹ (3.5) | Do. |
| Compound B | 20 | 50.5<br>¹ (439.0) | 61.0<br>¹ (129.0) | 14.5<br>¹ (16.0) | 40.5<br>¹ (192.0) | 4.0<br>¹ (3.6) | 4.0<br>¹ (6.9) | None. |
| | 40 | 20.0<br>¹ (112.1) | 15.0<br>¹ (46.3) | 12.5<br>¹ (16.8) | 39.0<br>¹ (166.0) | 2.0<br>¹ (0.6) | 3.5<br>¹ (1.5) | |
| | 80 | 18.5<br>¹ (110.0) | 15.0<br>¹ (16.0) | 10.5<br>¹ (14.3) | 32.0<br>¹ (157.5) | 1.0<br>¹ (0.1) | 3.0<br>¹ (3.5) | |
| Composition of compounds A+C | 90+10 | 12.5<br>¹ (111.5) | 15.0<br>¹ (16.3) | 2.0<br>¹ (1.0) | 19.0<br>¹ (38.0) | 1.5<br>¹ (0.7) | 3.0<br>¹ (2.1) | None. |
| | 180+20 | 1.5<br>¹ (0.1) | 2.0<br>¹ (0.5) | 0.0<br>¹ (0) | 3.5<br>¹ (1.0) | 0.0<br>¹ (0) | 0.0<br>¹ (0) | Do. |
| | 360+40 | 0.0<br>¹ (0) | 0.0<br>¹ (0) | 0.0<br>¹ (0) | 0.0<br>¹ (0) | 0.0<br>¹ (0) | 0.0<br>¹ (0) | Do. |
| | 720+80 | 0.0<br>¹ (0) | 0.0<br>¹ (0) | 0.0<br>¹ (0) | 0.0<br>¹ (0) | 0.0<br>¹ (0) | 0.0<br>¹ (0) | Do. |
| No treatment | | 48.5<br>(501) | 95.0<br>¹ (549.5) | 21.0<br>(47.5) | 40.5<br>(191.5) | 13.0<br>(5.7) | 42.0<br>(50.0) | None. |

¹ Control.

NOTE.—N*=Smartweed; H*=Goosefoot; O*=Green panicum; K*=Asiatic dayflower; P*=Common purslane; Q*=Long stemmed wort.

(Experiment 5)

Herbicidal test in dry field by sowing seeds

A field containing various weed seeds was divided into 4m²per block (2 ×2 m.). Rice seeds (species Kimmaze) were sowed in three lines.

Next day, each wettable powder of herbicidal composition prepared by the process similar to Example 3 was diluted with water and was applied at the rate of 150 liters per 10 Ares.

Rice was planted by conventional direct seed sowing methods onto dry field.

Forty days following the application of the herbicides, the herebicidal effects were observed, in accordance with the measurement of Experiment 1.

Then the field was filled with water to a depth of 5 cm. The herbicidal tests were made in each three blocks.

TABLE V

| Active ingredient | Amount (g/10 Ares) | Herbicidal Effect | | | | | | |
|---|---|---|---|---|---|---|---|---|
| | | *F | *E | *H | *I | *J | *K | *L |
| Compound A + Compound B (A₁+ B) | 90+10 | 4 | 4 | 4 | 4 | 4 | 3 | 3 |
| | 180+20 | 5 | 5 | 5 | 5 | 4.5 | 4 | 4 |
| | 360+40 | 5 | 5 | 5 | 5 | 5 | 5 | 5 |
| Compound A₂ + Compound B (A₂+ B) | 90+10 | 4 | 5 | 4 | 4 | 4.5 | 3 | 3.5 |
| | 180+20 | 5 | 5 | 5 | 5 | 5 | 4 | 4 |
| | 360+40 | 5 | 5 | 5 | 5 | 5 | 5 | 5 |
| Compound A₃ + Compound B (A₃+ B) | 90+10 | 5 | 5 | 4 | 4.5 | 5 | 3 | 3 |
| | 180+20 | 5 | 5 | 5 | 5 | 5 | 3.5 | 4 |
| | 360+40 | 5 | 5 | 5 | 5 | 5 | 4 | 5 |
| Compound A₁ (control) | 100 | 2 | 2 | 0 | 1 | 0 | 0 | 0 |
| | 200 | 3 | 3 | 0 | 2 | 0 | 0 | 0 |
| | 400 | 4 | 3 | 2 | 3 | 2 | 0 | 0 |
| Compound A₂ (control) | 100 | 2 | 1 | 0 | 1 | 0 | 0 | 0 |
| | 200 | 3 | 2 | 1 | 2.5 | 0 | 0 | 0 |
| | 400 | 4 | 4 | 2 | 3.5 | 2 | 0 | 0 |
| Compound A₃ (control) | 100 | 1 | 1 | 0 | 1 | 0 | 0 | 0 |
| | 200 | 3 | 3 | 1 | 2 | 1 | 0 | 0 |
| | 400 | 4 | 3 | 2 | 3 | 2 | 0 | 0 |
| Compound B | 12.5 | 0 | 1 | 2 | 1 | 2 | 0 | 0 |
| | 25 | 0 | 2 | 4 | 2 | 3 | 0 | 0 |
| (control) | 50 | 2 | 3 | 4.5 | 2.5 | 4 | 0 | 0 |
| No treatment | 0 | 0 | 0 | 0 | 0 | 0 | 0 | 0 |

Compound A₁: S-(4-chlorobenzyl)-N,N-dimethylthiocarbamate
Compound A₂: S-(4-chlorobenzyl)-N,N-diisopropylthiocarbamate
Compound A₃: S-(2-chlorobenzyl)-N,N-diethylthiocarbamate
* E large crabgrass
* F barnyard millet
* H goosefoot
* I barnyard grass
* J lady's thumb
* K Asiatic dayflower
* L Anelena Keisak HASSK Having now fully disclosed the invention, it will be apparent to one of ordinary skill in the art that many changes and modifications can be made thereto without departing from the spirit or scope of the invention. Accordingly,

What is claimed as new and intended to be covered by Letters Patent of the United States is:

1. A synergistic herbicidal composition comprising an effective amount of the mixture of a thiocarbamate having the general formula:

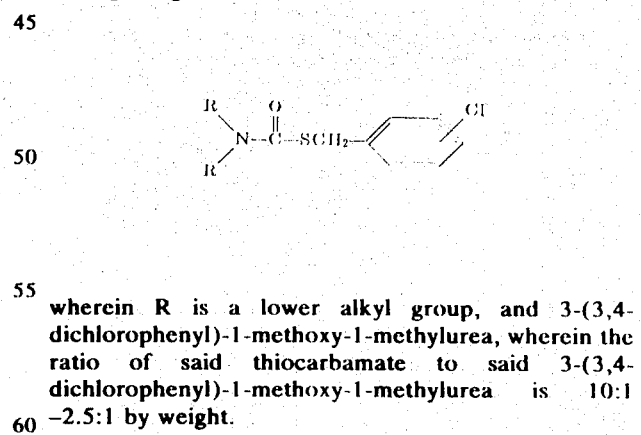

wherein R is a lower alkyl group, and 3-(3,4-dichlorophenyl)-1-methoxy-1-methylurea, wherein the ratio of said thiocarbamate to said 3-(3,4-dichlorophenyl)-1-methoxy-1-methylurea is 10:1 –2.5:1 by weight.

2. The herbicidal composition according to claim 1, wherein said thiocarbamate is S-(4-chlorobenzyl)-N,N-diethylthiocarbamate.

3. The herbicidal composition according to claim 1, wherein said thiocarbamate is S-(4-chlorobenzyl)-N,N-dimethylthiocarbamate.

4. The herbicidal composition according to claim 1, wherein said thiocarbamate is S-(4-chlorobenzyl)-N,N-diisopropylthiocarbamate.

5. The herbicidal composition according to claim 1, wherein said thiocarbamate is S-(2-chlorobenzyl)-N,N-diethylthiocarbamate.

6. The herbicidal composition according to claim 1, wherein said thiocarbamate is S-(2-chlorobenzyl)-N,N-diisopropylthiocarbamate.

7. The herbicidal composition according to claim 1 which is in granular form in combination with an extender and a binder.

8. The herbicidal composition according to claim 1 which is in the form of a water miscible solution.

9. The herbicidal composition according to claim 1 which is in the form of an emulsion.

10. The herbicidal composition according to claim 1 which is in the form of a powder.

* * * * *